US012647380B2

(12) United States Patent (10) Patent No.: US 12,647,380 B2
Kagarlitsky (45) Date of Patent: *Jun. 2, 2026

(54) SECURE MESSAGE INOCULATION

(71) Applicant: XATTIC, Inc., Palo Alto, CA (US)

(72) Inventor: Roman Kagarlitsky, Palo Alto, CA (US)

(73) Assignee: XATTIC, INC., Palo Alto, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 16/428,044

(22) Filed: May 31, 2019

(65) Prior Publication Data

US 2019/0356636 A1     Nov. 21, 2019

Related U.S. Application Data

(63) Continuation of application No. 15/205,712, filed on Jul. 8, 2016, now Pat. No. 10,348,690.

(51) Int. Cl.
H04L 9/40 (2022.01)
G06F 40/134 (2020.01)
(Continued)

(52) U.S. Cl.
CPC .......... H04L 51/066 (2013.01); G06F 40/134 (2020.01); G06V 30/224 (2022.01);
(Continued)

(58) Field of Classification Search
CPC ... H04L 63/0281; H04L 51/066; H04L 51/08; H04L 51/18; H04L 63/10; H04L 63/1466;

H04L 67/42; H04L 51/12; H04L 51/22; H04L 51/063; H04L 63/1483; H04L 67/01; H04L 51/212; H04L 63/145; G06F 40/14;

(Continued)

(56) References Cited

U.S. PATENT DOCUMENTS 6,141,695  A  *  10/2000  Sekiguchi  ..........  H04N 1/00209
                                                              709/206
6,157,706  A  *  12/2000  Rachelson  .........  H04N 1/32411
                                                              379/90.01
(Continued)

FOREIGN PATENT DOCUMENTS

JP        2001273206  A  *  10/2001
JP        2002044152  A  *  2/2002   ..........  G06Q 10/107
(Continued)

OTHER PUBLICATIONS

Lidong et al., MMSEmail: Delivering Emails to Mobile phone through MMS, 2009, IEEE.*
(Continued)

*Primary Examiner* — David Garcia Cervetti
(74) *Attorney, Agent, or Firm* — SCHWEGMAN LUNDBERG & WOESSNER, P.A.

(57) ABSTRACT

A message directed to a recipient of a messaging client is intercepted and prevented from reaching the messaging client in a native sent message format as sent from a sender of the message. One or more portions of the message are rendered to a format that is incapable of execution by a device and the message in the format that is incapable of execution is delivered to the messaging client for viewing and/or printing by the recipient.

18 Claims, 4 Drawing Sheets

(51) Int. Cl.

| | | |
|---|---|---|
| *G06V 30/224* | (2022.01) | |
| *H04L 51/066* | (2022.01) | |
| *H04L 51/08* | (2022.01) | |
| *H04L 51/18* | (2022.01) | |
| *G06V 30/10* | (2022.01) | |

(52) U.S. Cl.
CPC .............. *H04L 51/08* (2013.01); *H04L 51/18* (2013.01); *H04L 63/0281* (2013.01); *H04L 63/10* (2013.01); *H04L 63/1466* (2013.01); *G06V 30/10* (2022.01)

(58) Field of Classification Search
CPC ...... G06F 40/134; G06Q 10/107; G06K 9/18; G06K 2209/01; G06V 30/224; G06V 30/10
See application file for complete search history.

(56) References Cited

U.S. PATENT DOCUMENTS

| | | | | |
|---|---|---|---|---|
| 6,345,389 B1 * | 2/2002 | Dureau | ............ | H04N 21/42203 348/E7.071 |
| 6,424,426 B1 * | 7/2002 | Henry | ............... | H04N 1/00374 379/100.09 |
| 6,469,798 B1 * | 10/2002 | Toyoda | .............. | H04N 1/00214 358/1.15 |
| 6,493,105 B1 * | 12/2002 | Onuma | ............. | H04N 1/00222 358/1.15 |
| 6,574,670 B1 * | 6/2003 | Eguchi | .............. | H04N 1/32416 709/236 |
| 6,643,687 B1 * | 11/2003 | Dickie | ................. | G06Q 10/107 709/206 |
| 6,707,580 B1 * | 3/2004 | Bloomfield | ........ | H04N 1/00312 379/100.09 |
| 6,778,287 B1 * | 8/2004 | Toyoda | .............. | H04N 1/32662 358/1.15 |
| 6,836,789 B1 * | 12/2004 | Toyoda | .............. | H04N 1/00241 358/404 |
| 6,892,239 B1 * | 5/2005 | Kirkeby | ................ | H04L 51/066 358/402 |
| 6,901,519 B1 * | 5/2005 | Stewart | ................... | G06F 21/56 709/206 |
| 6,914,693 B1 * | 7/2005 | Kirkeby | ............. | H04N 1/32545 358/1.15 |
| 6,937,359 B2 * | 8/2005 | Toyoda | .............. | H04N 1/33369 358/1.15 |
| 6,985,576 B1 * | 1/2006 | Huck | ................. | H04M 3/5191 379/265.09 |
| 7,283,264 B2 * | 10/2007 | Parry | ................... | G06F 3/1267 358/1.15 |
| 7,296,058 B2 * | 11/2007 | Throop | ................. | H04L 67/565 709/206 |
| 7,380,126 B2 * | 5/2008 | Logan | .................... | H04L 63/12 705/64 |
| 7,506,155 B1 * | 3/2009 | Stewart | ................. | H04L 63/145 713/150 |
| 7,543,035 B2 * | 6/2009 | Fujise | ................... | H04L 51/066 358/1.15 |
| 7,653,815 B2 * | 1/2010 | Godfrey | ............... | H04W 24/02 713/176 |
| 7,673,327 B1 * | 3/2010 | Polis | .................... | G06F 16/958 713/153 |
| 8,185,591 B1 * | 5/2012 | Lewis | ................. | G06Q 10/107 715/764 |
| 8,200,761 B1 * | 6/2012 | Tevanian | .............. | H04L 51/212 709/206 |
| 8,355,701 B2 * | 1/2013 | Adams | ................. | H04L 51/214 455/418 |
| 8,682,986 B2 * | 3/2014 | Sekiguchi | .......... | H04N 1/00206 710/15 |
| 8,973,137 B1 * | 3/2015 | Oliver | ................. | H04W 12/128 726/25 |
| 9,100,799 B1 * | 8/2015 | Thiagarajan | ............ | H04W 4/06 |
| 9,143,439 B2 * | 9/2015 | Wang | ...................... | H04L 45/46 |
| 9,426,112 B1 * | 8/2016 | Jha | ........................... | H04L 51/42 |
| 9,471,899 B2 * | 10/2016 | Beyer | ................... | H04L 51/234 |
| 9,559,997 B1 * | 1/2017 | Everton | ............... | H04L 51/212 |
| 9,577,966 B1 * | 2/2017 | Dorsey | .................. | H04L 51/04 |
| 9,626,341 B1 * | 4/2017 | Guan | ..................... | G06F 40/109 |
| 9,853,928 B2 * | 12/2017 | Dabbiere | ............... | H04W 4/02 |
| 11,439,663 B2 * | 9/2022 | Attar | ...................... | A61K 47/42 |
| 12,346,884 B2 * | 7/2025 | Foster | ............... | G06Q 20/0425 |
| 2002/0059382 A1 * | 5/2002 | Yamaguchi | .......... | G06Q 10/107 709/206 |
| 2002/0059383 A1 * | 5/2002 | Katsuda | ................ | H04L 51/063 709/206 |
| 2002/0063882 A1 * | 5/2002 | Sekiguchi | .......... | H04N 1/00212 358/1.15 |
| 2002/0191223 A1 * | 12/2002 | Ishikawa | ............ | H04N 1/32797 358/440 |
| 2003/0030837 A1 * | 2/2003 | Simpson | ................ | G06K 15/02 358/1.15 |
| 2003/0040300 A1 * | 2/2003 | Bodic | ................... | H04L 51/066 455/466 |
| 2003/0065941 A1 * | 4/2003 | Ballard | ................... | H04L 63/04 726/1 |
| 2003/0072025 A1 * | 4/2003 | Simpson | ................ | G06F 3/125 358/1.15 |
| 2003/0112460 A1 * | 6/2003 | Simpson | ............. | G06F 3/1205 358/1.15 |
| 2003/0115247 A1 * | 6/2003 | Simpson | ............. | H04L 67/306 709/200 |
| 2003/0120768 A1 * | 6/2003 | Simpson | ............ | G06F 16/9562 709/224 |
| 2003/0142364 A1 * | 7/2003 | Goldstone | .......... | H04L 63/0442 358/402 |
| 2003/0145057 A1 * | 7/2003 | Throop | ................. | H04L 67/565 709/206 |
| 2003/0229810 A1 * | 12/2003 | Bango | ................... | G06F 21/566 713/188 |
| 2004/0036907 A1 * | 2/2004 | Simpson | ............ | H04N 1/00204 358/1.15 |
| 2004/0068695 A1 * | 4/2004 | Daniell | ................. | H04L 51/212 715/234 |
| 2004/0184095 A1 * | 9/2004 | Ogawa | .................... | H04L 51/48 358/1.15 |
| 2004/0201615 A1 * | 10/2004 | Dietz | .................... | G06F 16/957 707/E17.119 |
| 2004/0205493 A1 * | 10/2004 | Simpson | ................ | G06Q 30/02 707/E17.119 |
| 2005/0027781 A1 * | 2/2005 | Curry | ................... | G06Q 10/107 709/200 |
| 2005/0066007 A1 * | 3/2005 | Wieczorek | ............. | H04W 4/12 709/206 |
| 2005/0144243 A1 * | 6/2005 | Cheng | ................... | G06F 40/143 709/206 |
| 2005/0251693 A1 * | 11/2005 | Shevchenko | ....... | H04L 63/0209 713/193 |
| 2005/0257159 A1 * | 11/2005 | Keohane | .............. | G06Q 10/107 715/752 |
| 2005/0278626 A1 * | 12/2005 | Malik | .................. | H04L 63/1408 715/201 |
| 2005/0278627 A1 * | 12/2005 | Malik | .................. | G06F 21/6263 715/255 |
| 2006/0200568 A1 * | 9/2006 | Kim | ........................ | H04L 51/58 709/227 |
| 2006/0224680 A1 * | 10/2006 | Terayoko | .............. | H04L 51/063 709/206 |
| 2006/0265464 A1 * | 11/2006 | Nassiri | ................... | H04L 51/23 709/206 |
| 2007/0081642 A1 * | 4/2007 | Owens | ................... | H04L 51/56 379/93.24 |
| 2007/0100999 A1 * | 5/2007 | Haider | ................. | G06Q 10/107 709/225 |
| 2007/0178918 A1 * | 8/2007 | Shon | ....................... | H04W 4/14 455/466 |
| 2007/0201383 A1 * | 8/2007 | Ong | ....................... | H04L 41/12 370/254 |

(56) References Cited

U.S. PATENT DOCUMENTS

| | | | | | |
|---|---|---|---|---|---|
| 2007/0213076 | A1* | 9/2007 | Mian | H04W 4/18 | 455/466 |
| 2007/0239631 | A1* | 10/2007 | Wang | H04M 1/72427 | 706/12 |
| 2007/0255792 | A1* | 11/2007 | Gronberg | H04L 51/066 | 709/206 |
| 2008/0091784 | A1* | 4/2008 | Sundstrom | G06F 40/126 | 709/206 |
| 2008/0098237 | A1* | 4/2008 | Dung | H04L 51/00 | 726/30 |
| 2008/0120385 | A1* | 5/2008 | Maoz | G06Q 10/10 | 709/206 |
| 2008/0162649 | A1* | 7/2008 | Lee | G06Q 10/107 | 709/206 |
| 2008/0229416 | A1* | 9/2008 | Stewart | G06F 21/566 | 726/22 |
| 2009/0067414 | A1* | 3/2009 | Toscano | H04N 1/00212 | 709/206 |
| 2009/0098883 | A1* | 4/2009 | Yoon | H04W 4/024 | 455/566 |
| 2009/0132658 | A1* | 5/2009 | Glickstein | H04L 51/212 | 709/206 |
| 2009/0165138 | A1* | 6/2009 | Stewart | G06F 21/567 | 726/24 |
| 2009/0215411 | A1* | 8/2009 | Tucker | H04W 76/45 | 455/90.2 |
| 2010/0235636 | A1* | 9/2010 | Cohen | H04L 51/066 | 713/168 |
| 2010/0246535 | A1* | 9/2010 | Lindner | H04W 36/385 | 370/332 |
| 2010/0306845 | A1* | 12/2010 | Vaithilingam | H04L 51/212 | 709/206 |
| 2011/0078264 | A1* | 3/2011 | Halahmi | H04L 51/18 | 709/206 |
| 2011/0099238 | A1* | 4/2011 | Du | H04L 51/063 | 709/206 |
| 2011/0216892 | A1* | 9/2011 | Luong | H04N 1/32715 | 379/100.01 |
| 2012/0123778 | A1* | 5/2012 | Yasrebi | H04L 51/212 | 704/235 |
| 2012/0231774 | A1* | 9/2012 | Blades | H04W 4/14 | 455/414.4 |
| 2012/0259932 | A1* | 10/2012 | Kang | H04L 51/58 | 709/206 |
| 2012/0284347 | A1* | 11/2012 | Cohen | H04L 51/066 | 709/206 |
| 2012/0322466 | A1* | 12/2012 | Das | H04W 8/005 | 455/458 |
| 2013/0038898 | A1* | 2/2013 | Nuggehalli | G06F 3/1238 | 358/1.15 |
| 2013/0194301 | A1* | 8/2013 | Robbins | H04L 51/02 | 345/629 |
| 2013/0275383 | A1* | 10/2013 | McLarty | G06Q 10/107 | 707/670 |
| 2013/0326089 | A1* | 12/2013 | Harrison | H04M 1/24 | 710/5 |
| 2014/0019499 | A1* | 1/2014 | Arai | G06F 16/182 | 707/827 |
| 2014/0026187 | A1* | 1/2014 | Johnson | H04L 63/08 | 726/3 |
| 2014/0040770 | A1* | 2/2014 | Khoo | G06F 3/0482 | 715/752 |
| 2014/0059594 | A1* | 2/2014 | Stein | H04N 21/6405 | 725/33 |
| 2014/0161255 | A1* | 6/2014 | Tonegawa | H04L 63/0823 | 380/246 |
| 2014/0287676 | A1* | 9/2014 | Sheikh | H04H 20/95 | 455/3.06 |
| 2014/0289857 | A1* | 9/2014 | Stewart | H04L 63/1416 | 726/24 |
| 2015/0121203 | A1* | 4/2015 | Saund | G06F 40/103 | 715/249 |
| 2015/0244755 | A1* | 8/2015 | Kuang | H04N 21/8153 | 709/219 |
| 2015/0312183 | A1* | 10/2015 | Hu | H04L 67/565 | 715/752 |
| 2015/0326517 | A1* | 11/2015 | Block | H04L 63/0807 | 709/206 |
| 2015/0371049 | A1* | 12/2015 | Xavier | G06T 11/00 | 726/26 |
| 2016/0088115 | A1* | 3/2016 | Agnew | H04L 51/226 | 709/212 |
| 2016/0248936 | A1* | 8/2016 | Ow | H04L 51/04 | |
| 2017/0041260 | A1* | 2/2017 | Ewanchuk | H04L 51/066 | |
| 2017/0163585 | A1* | 6/2017 | Halahmi | H04L 51/08 | |
| 2018/0013725 | A1 | 1/2018 | Kagarlitsky | | |
| 2018/0159943 | A1* | 6/2018 | Poon | H04L 67/63 | |
| 2021/0104301 | A1* | 4/2021 | Peccoud | H04L 9/0825 | |

FOREIGN PATENT DOCUMENTS

| | | | | |
|---|---|---|---|---|
| JP | 2002149574 A | * | 5/2002 | G06Q 10/107 |
| WO | 2018009592 | | 1/2018 | |

OTHER PUBLICATIONS

Lidong et al., MMSEmail: Delivering Emails to Mobile phone through MMS, 2009, IEEE. (Year: 2009).*

"International Application Serial No. PCT US2017 040797, International Search Report mailed Sep. 14, 2017", 2 pgs.

"International Application Serial No. PCT US2017 040797, Written Opinion mailed Sep. 14, 2017", 6 pgs.

"International Application Serial No. PCT US2017 040797, International Preliminary Report on Patentability mailed Jan. 17, 2019", 8 pgs.

* cited by examiner

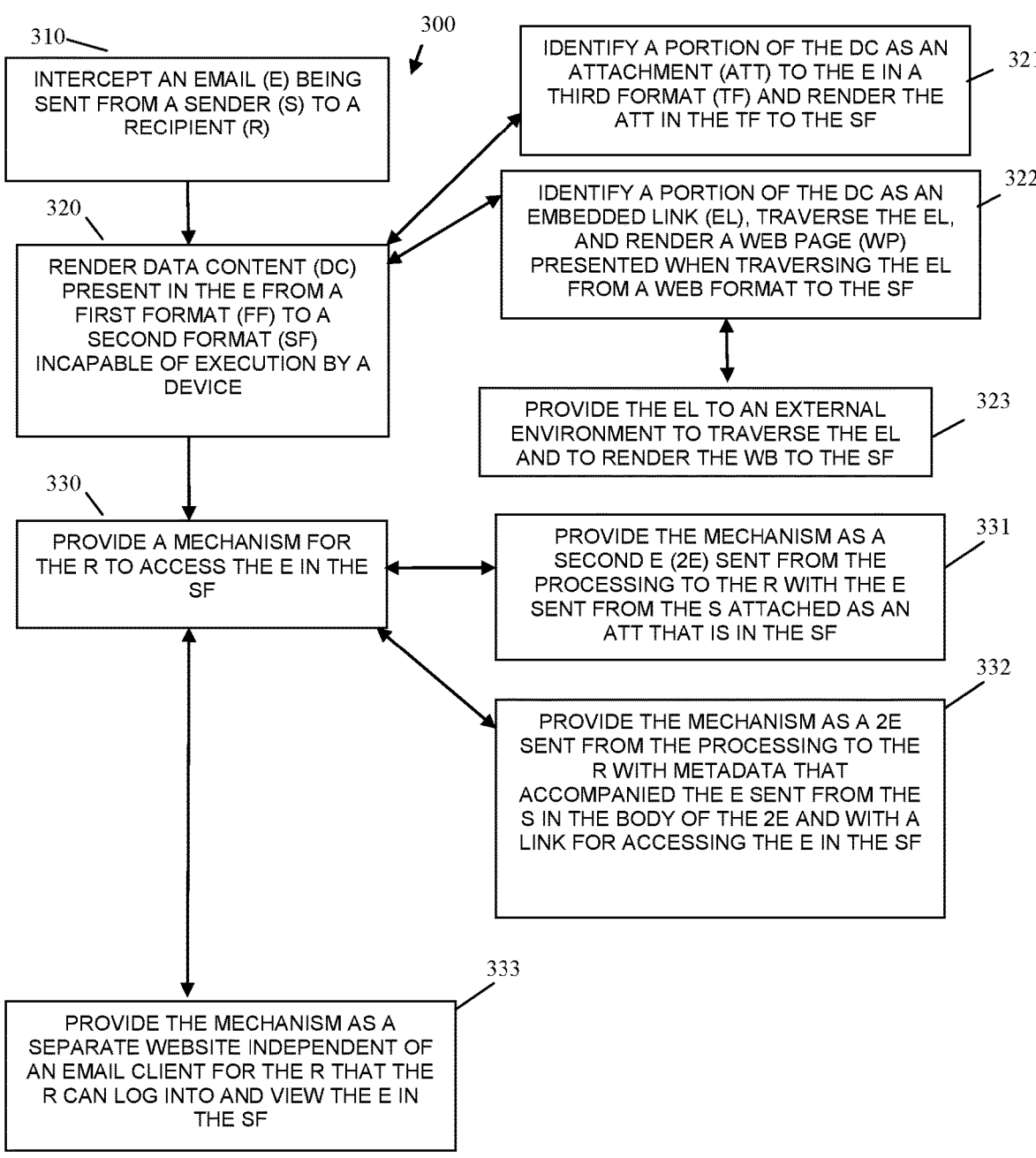

310

INTERCEPT AN EMAIL (E) BEING SENT FROM A SENDER (S) TO A RECIPIENT (R)

300

320

RENDER DATA CONTENT (DC) PRESENT IN THE E FROM A FIRST FORMAT (FF) TO A SECOND FORMAT (SF) INCAPABLE OF EXECUTION BY A DEVICE

330

PROVIDE A MECHANISM FOR THE R TO ACCESS THE E IN THE SF

321

IDENTIFY A PORTION OF THE DC AS AN ATTACHMENT (ATT) TO THE E IN A THIRD FORMAT (TF) AND RENDER THE ATT IN THE TF TO THE SF

322

IDENTIFY A PORTION OF THE DC AS AN EMBEDDED LINK (EL), TRAVERSE THE EL, AND RENDER A WEB PAGE (WP) PRESENTED WHEN TRAVERSING THE EL FROM A WEB FORMAT TO THE SF

323

PROVIDE THE EL TO AN EXTERNAL ENVIRONMENT TO TRAVERSE THE EL AND TO RENDER THE WB TO THE SF

331

PROVIDE THE MECHANISM AS A SECOND E (2E) SENT FROM THE PROCESSING TO THE R WITH THE E SENT FROM THE S ATTACHED AS AN ATT THAT IS IN THE SF

332

PROVIDE THE MECHANISM AS A 2E SENT FROM THE PROCESSING TO THE R WITH METADATA THAT ACCOMPANIED THE E SENT FROM THE S IN THE BODY OF THE 2E AND WITH A LINK FOR ACCESSING THE E IN THE SF

333

PROVIDE THE MECHANISM AS A SEPARATE WEBSITE INDEPENDENT OF AN EMAIL CLIENT FOR THE R THAT THE R CAN LOG INTO AND VIEW THE E IN THE SF

SECURE MESSAGE INOCULATION

PRIORITY APPLICATIONS

This application is a continuation of U.S. patent application Ser. No. 15/205,712, filed Jul. 8, 2016, the content of which is incorporated herein by reference in its entirety.

BACKGROUND

Business and the personal affairs of individuals are conducted via messaging technologies, such as emails, instant messages, and texts. In fact, more people send email messages and Short Messaging Service (SMS) messages (texts) these days than they call each other on their phones. Hackers and scammers are continually looking for ways to penetrate the devices of businesses and individuals for malicious purposes or for purposes of learning more about an individual to make a sale of some sort to that individual.

Messaging technologies have advanced over the years to the point that messages are no longer just plain text. The content of messages can include links, images, text, graphics, video, audio, and scripts that execute within the messaging clients. This has created a variety of security holes that enterprises are continually trying to thwart.

Many approaches exist in the software industry to make messaging communications more secure. One approach is to pre-scan incoming messages at the messaging server before the messages are released to the messaging clients for viewing. During pre-scan, if a high degree of security is needed, many valid messages are held in a portal that may in fact be: harmless, desired, expected, and/or needed by the recipient of those messages. The held messages are often summarized once or twice daily and sent in summary form for the recipient to decide whether to release the messages or ignore the message and let the held messages delete, in due course, from the portal. This is hardly a timely process and messages that the recipient needed to timely respond may have become stale or late, which could impact business of the recipient or reflect poorly on a reputation of the recipient.

Moreover, when the server pre-scan approach has a security setting for messages that is set too low, the recipient may inadvertently open a message that the recipient believes to be safe and unknowingly unleash a script that could install spyware or malware on the recipient's device. Still further, if links are accessed within a malicious message received in the recipient's messaging client, the recipient may unknowingly access a phishing web page and disclose confidential information about the recipient, such as passwords, users' identifiers, social security numbers, home addresses, credit card numbers, financial account numbers, and the like.

Other messaging security approaches attempt to filter and scan the messages within the messaging clients when received from the messaging servers. These approaches suffer from the same deficiencies as the pre-scan at the messaging server approach in that both approaches rely on updated virus and spyware patterns that are constantly changing in response to new threats. But, if the patterns are not available or not updated yet to the messaging client and/or messaging server, then malicious messages still end up in the recipient's messaging inbox and pose security risks to the recipient and the recipient's device.

Some approaches use both the messaging server pre-scan and the messaging client scan on recipients' messages. Again, harmful messages still find their way into the recipients' messaging clients when the predefined patterns are not yet available for recognizing those harmful messages.

In still other approaches, message servers and clients use digital signatures and/or digital certificates for verifying the authenticity of the senders of the messages. However, this is not widely deployed and in some cases incompatible with some messaging clients. Recipients want to view all legitimate messages sent to them and not just those messages where the recipients have preauthorized known senders with verifiable signatures and/or certificates. Additionally, signature/certificate approaches fail when a trusted sender is hacked and sends a malicious message.

Therefore, there is a need for improving the security of messaging technologies having more timely message processing that does not have to rely on continuously updating pattern definitions and/or validating digital signatures and/or digital certificates.

SUMMARY

Various embodiments herein provide methods and systems for inoculating messaging systems. In one example embodiment, a method for inoculating a messaging communication is presented.

Specifically, in one example embodiment, a message is received that is sent from a sender and directed to a recipient associated with a messaging client. Next, the message is rendered in a messaging format to an image format. Finally, the message is stored in the image format in a location accessible to the messaging client.

BRIEF DESCRIPTION OF THE DRAWINGS

FIG. 3 is a diagram of another method for inoculating messaging communications, according to an example embodiment.

DETAILED DESCRIPTION

Figure 1:
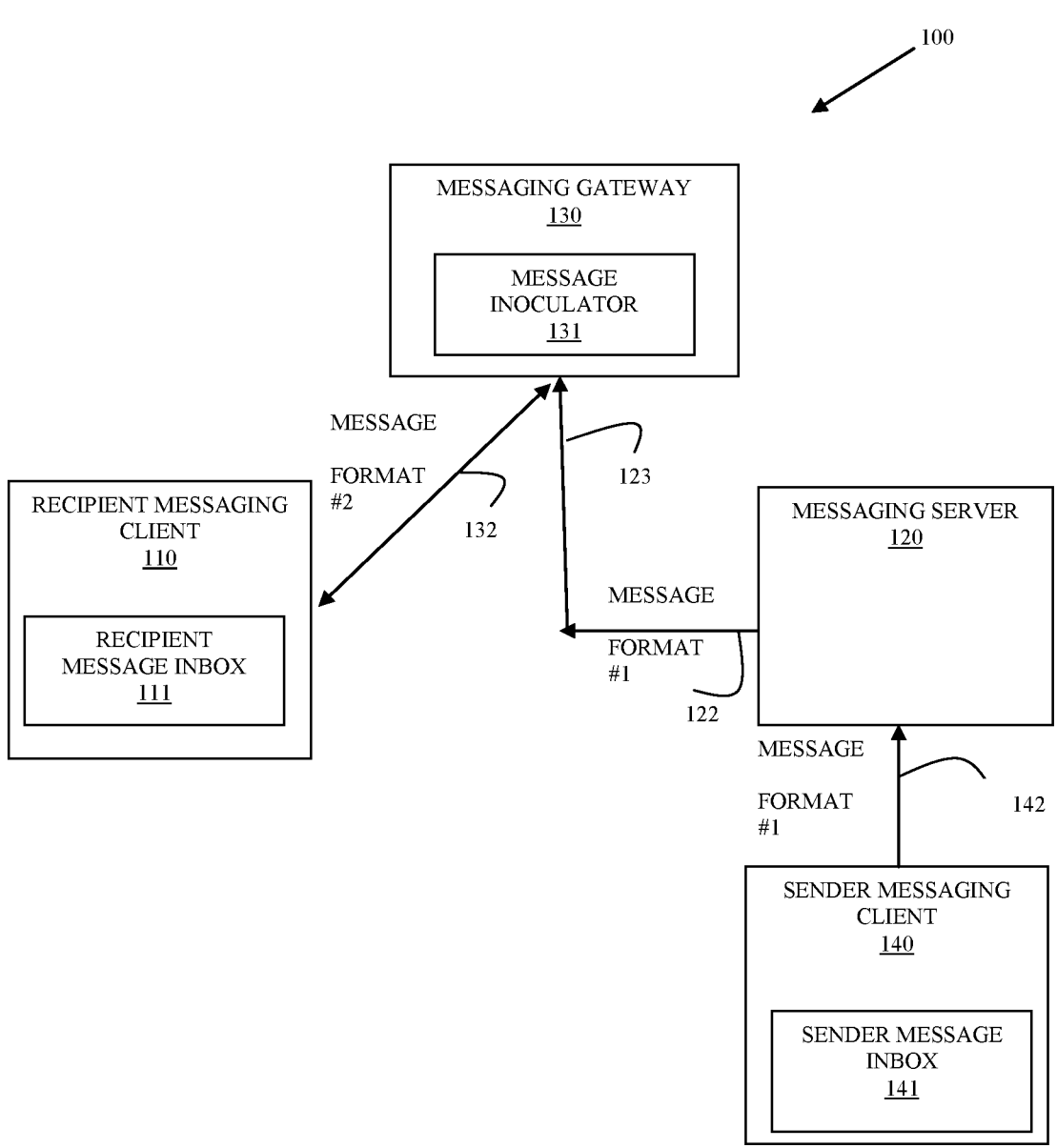
FIG. 1 is a diagram depicting an example architectural processing environment for practicing inoculation of messaging communications, according an example embodiment.

As will be demonstrated with the teachings presented herein and below, messaging security can be enhanced by integration into messaging systems. The techniques presented allow for improved security benefits while leveraging existing messaging delivery technology with a new approach for inoculating (rendering harmless) messages before such messages are delivered to messaging clients.

A "resource" includes a user, service, system, device, directory, data store, groups of users, files, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

A "messaging gateway" as used herein and below defines an independent device and/or processing environment from that which is associated with a messaging client and a messaging server of a messaging system. The independent processing environment may reside on: a same device as the messaging client, a same device as the messaging server, or on an independent device that is separate from the devices of the client and/or server.

In an embodiment, the messaging gateway is an email gateway, and the email gateway is accessed during email message processing within an existing email system through a "milter" (a special type of email filter). A milter is an open source filter that is hooked into an existing email system (client and/or server) processing. The milter is processed during delivery of an email message from a sender (a type of principal, such as user or automated program) and directed to a recipient (a type of principal, such as a user or automated program). This permits integration of the messaging gateway (as an email gateway) and its processing (described herein) by hooking a milter into an existing email system that calls and processes the messaging gateway.

A "message" as used herein can be an email, a text, or an instant message. A "messaging system" includes at least one messaging server and one or more messaging clients, each client associated with a messaging account (such as a user or automated program resource programmed to handle messages in an automated manner).

The use of the word "intercept" (and this word's morphological variants), as used herein, is intended to mean acquire and prevent the intended recipient of a message from obtaining or acquiring that communication. So, when a message is intercepted (as described herein and below) when a sender sends the message to a recipient, the recipient never obtains and/or sees that message in the original message format that the message was sent in by the sender.

Therefore, as used herein "intercepting" means: i) obtaining a message from a message delivery stream, and ii) preventing that obtained message from being further passed or provided to a messaging client of the intended recipient of that message. It is important to note that the messaging client never obtains the message in an original sent message format that was sent from the sender (unless as noted herein and below).

Accordingly, in each of the embodiments, discussed herein and below, the messaging client is incapable of receiving messages from a sender in an original message format that the sender sent the message in (except and as noted herein and below when the processing is configured to selectively permit some senders to deliver the messages to the intended recipient in an original message format).

Thus, the processing in some embodiments described, herein and below: i) intercepts a message in the original message delivery format; ii) prevents and ensures that the recipient or recipient's message client does not receive the message in the original sent message format, iii) optically transforms the message (and various component pieces of the message) from the original sent message format to an optical or print data format (which is incapable of execution), and iv) delivers to the recipient or the recipient's messaging client the message in the optical or print format for only viewing and/or printing within the recipient's messaging client. "Optically transforms" as used herein means taking an image of the message in pixel format. This can be done in a number of ways, such as through a screen shot of a displayed message, through conversion to print data that is printed and then displayed in an image format, and others.

Various embodiments can be implemented as enhancements within: existing network architectures, existing messaging systems, network-enabled devices, and composite devices.

Also, any software presented herein is implemented in (and resides within) hardware machines, such as hardware processor(s) or hardware processor-enabled devices (having hardware processors). These machines are configured and programmed to specifically perform the processing of the methods and system presented herein. Moreover, the methods and system are implemented and reside within a non-transitory computer-readable storage media or memory as executable instructions that are processed on the machines (processors) configured to perform the methods.

Of course, the embodiments can be implemented in a variety of architectural platforms, systems, devices, operating and server systems, and/or applications. Any particular architectural layout or implementation presented herein is provided for purposes of illustration and comprehension of particular embodiments only and is not intended to limit other embodiments of the subject matter presented herein and below.

It is within this context that embodiments are now discussed within the context of the FIGS. 1-4.

FIG. 1 is a diagram depicting an example architectural processing environment 100 for practicing inoculation of messaging communications, according an example embodiment. It is noted that the architectural processing environment 100 is presented as an illustrated embodiment and that other component definitions are envisioned without departing from the embodiments discussed herein. It is also to be noted that only those components necessary for comprehending the embodiments are presented, such that more or less components may be used without departing from the teachings presented herein.

The architectural processing environment 100 includes: a recipient messaging client 110 having a recipient message inbox 111, a messaging server 120, a messaging gateway 130 having a message inoculator 131, and a sender messaging client 140 having a sender message inbox 141.

The description that follows for the FIG. 1 is presented for email processing of email systems; albeit it is to be noted that this processing may also apply to instant messaging and texting with modifications to the components and modules associated with instant messaging and texting to include the inoculator 131 and a mechanism for intercepting message delivery before reaching the recipient through the recipient's device.

Initially, a messaging system, such as an email system includes one or more email servers 120 and a plurality of recipient email clients 110 (only one shown in the FIG. 1 for ease of comprehension and illustration). In an embodiment, the sender email client 140 is not part of the same mail system as the recipient email client 110, and the email client 110 is part of the same email system associated with the one or more email servers 120. In another situation and in an embodiment where there is a desire to inoculate messages within a same email system both the recipient email client 110 and the sender email client 140 are part of the same email system associated with the one or more email servers 120.

The recipient email client 110 is associated with a principal account with the email system. The principal can be a user or an automated program configured to send and receives emails through the recipient email client 110. The principal operates (in a case where the principal is a user) a device or processes on a device. The device can include: a laptop, a wearable processing device, a desktop, a processor-enabled appliance, and the like.

The principal is designated a sender of a message (email) from the recipient email client 110 when the principal sends an email. The principal is designated a receiver of an email into the recipient message inbox 111 (recipient email inbox 111) when a different principal sends the email for which the principal is designated as a recipient of that email.

Conventionally, the email system processes emails by resolving a domain portion of an email address directed to a recipient of an email (i.e., principal@domain.com) and forwarding the email to the email server (based on "domain.com"). The email server then uniquely identifies the recipient through the portion of the email address that precedes the "@" character (identifier), in this case "principal." The identifier that precedes the "@" character is unique within the domain ("domain.com"). This permits the email server to uniquely identify the email inbox and deliver the emails to the email client. Delivery can occur automatically upon receipt of the emails from the email server to the email inbox, or delivery can occur when requested by the email client from the email server (such as when the principal logs in and authenticates for access to the email inbox).

The messaging gateway 130 is integrated into this conventional processing flow to enhance email delivery, email processing, and email sending in the manners discussed herein and below.

A variety of integration scenarios are possible with the teachings presented herein.

For example, in a first integration scenario, the email server 120 receives an email directed to a principal and sent from a sender in a conventional manner (over 142 from the sender's message inbox 141 associated with the sender's messaging client 140). However, instead of the email server 120 forwarding the email to the recipient message inbox 111 of the principal (recipient) (over 122), the email server 120 uses a milter that calls the messaging gateway 130 (over 123).

Once the email is received by the messaging gateway 130 it is in a mail delivery format (original message format #1). The email includes metadata (such as a header and other fields) that identify the principal (recipient), the sender of the email, subject field descriptive text, and a variety of other information (such as an email server identifier, date and time message sent, and the like). The email also includes an email body (contents or payload of the email). In some cases, the email may also include one or more attachments. The email body may also include embedded Uniform Resource Locator (URL) links that when activated spawn a browser application from the message inbox 111 to a web site/page. The email body may also include embedded images (which may or may not have (URL links) associated with the images when the images are clicked or activated within the email body. The email attachments (if any) can be in a variety of data formats based on what the sender attached or elected to attach as an email attachment.

When the email (header, body, and any attachments) is received at the messaging gateway 130. The message inoculator 131 optically images, at least the email body, to produce an image format (message format #2) for the email body of the email.

In an embodiment, the message inoculator 131 performs a variety of additional processing. For example, the message inoculator 131 can parse the email body for the email in its original sent mail format (the format #1) for embedded or hidden URLs. When an embedded link is found, the message inoculator 131 traverses or activates the link and optically images the web page that is displayed and saves that imaged web page as an attachment image (the format #2) for the email. This can be iteratively processed by the message inoculator 131 for each embedded link found in the email body. In an embodiment, the message inoculator 131 does not activate the embedded links; rather, the message inoculator 131 forwards the link to a separate processing environment (remote and external from the messaging gateway 130) for activation and imaging (to the format #2). This ensures that the processing environment of the email gateway 130 remains relatively clean and free of any potential virus infection that may result from activating the embedded link(s).

In an embodiment, the message inoculator 131 also images the metadata of the email and saves this as a third type of image for the email (still in the format #2): the email body (first type of image in the format #2), the web pages for any embedded links in the email body (zero or more second types of images in the format #2), and the metadata (third type of image in the format #2). That is, the email is in a first format and from that three types of images are produced each of which are in the second format (optical/image or print format): the first type of image/print format is for the email body having the contents of the email message from the sender; the second type of image/print format represents web pages for any embedded links; and the third type of image/print format is for the metadata that accompanies the email message (fields for: header including: sender, recipient, subject, date, time, etc.).

In an embodiment, the message inoculator 131 determines whether any attachments are attached to the email. The type of attachment (if present) can be resolved by the message inoculator 131 in a few manners. First, the name of the file extension on the attachments may indicate what the data format type is for the attachments. Second, scanning the contents of the attached file may reveal a known format or known codes for a known data format. If the type is not capable of being determined by the message inoculator 131 or if the type is known to be a dangerous or malicious type (through predefined patterns and definitions), the message inoculator 131 can remove the attachment entirely from the email and delete it or quarantine it. Once, the type is known and determined to not be any known dangerous type, the message inoculator 131 opens the attachment using an application that is known to display the attachment type (such as a word processor, etc.). Once the attachments are opened it is imaged or printed to an image format; resulting in a fourth type of image for the email (again in the format #2 (image/print format)); the fourth type is an image representing attachment(s) to the email.

All four types are in the same format #2 (image/print format) and represent different structural components associated with the email: first type is the email body, the second type is embedded web pages from resolved embedded links, the third type the metadata accompanying the email, and the fourth type any attachments to the email.

Next, the message inoculator 131 constructs a new email that includes new metadata indicating that the new email is coming or being sent from the messaging gateway 130 and, in some cases, including some of the original email's metadata, such as subject, original sender, and the like. The image representing the original email's body is the attached to the new email along with, optionally and depending upon the components found in the original email, the image representing the original email's metadata, images representing any of the original email's body embedded links for the web pages associated with activating those links, and images representing any of the original email's attachments.

The message inoculator 131 then sends the new email with the image(s) representing the original email sent from the sender to the recipient message inbox 111 (over 132) of the principal (recipient). The images are incapable of being executed or processed by the recipient email client 110 or the device executing and accessing the recipient email client 110 and being operated by the principal.

In this manner, the original email sent from the sender has been completely rendered innocuous by the message inoculator 131. The principal can still view and print the original email from the sender but the principal can be assured that the original email is incapable of infecting, spying, or phishing the principal's device, the email client 110, or the principal because the original email can only be safely viewed or safely printed.

In a second integration scenario, the messaging gateway 130 is configured to act as a forward proxy or a transparent proxy to the email server 120. Here, the processing described above occurs in the same manner and the new email is delivered with the new metadata (from the messaging gateway 130) to the email server 120 for delivery through the email server 120 to the principal associated with the recipient email client 110 and the recipient message inbox 111. This scenario requires no hook, such as the milter, in the email server 120. This scenario may also ensure that the email server 120 is more secure when handing emails directed to the recipient email client 110.

In a third integration scenario, the messaging gateway 130 is configured to act as a transparent proxy to the recipient email client 110. Here, the processing is similar to what was described with the first integration scenario but no milter activates the email gateway processing; rather, the messaging gateway 130 monitors emails being directed to the recipient email client 110 and obtains those emails before they can be delivered to the recipient email client 110 and performs the above-mentioned processing.

In a fourth integration scenario, the messaging gateway 130 is an email gateway activated and called through a hook/filter in the recipient email client 111 before the email is capable of being displayed or presented for access within the recipient message inbox 111. The same processing for the message inoculator 131 occurs in this scenario as that what was discussed for the first and third scenarios. However, in this scenario, the message inoculator 131 may also delete and remove the email received on the recipient email client 111 once the email is forwarded to the messaging gateway 130 for the processing, such that the email is incapable of every being processed or handled in its original sent format from the sender on the recipient email client 110 or within the recipient message inbox 111 (except for calling the message inoculator 131 and forwarding the email in the original sent format to the message inoculator 131 for processing).

In an embodiment, the message inoculator 131 may be integrated into the processing of an existing messaging system (client and/or server) for a fifth integration scenario. In this embodiment, the existing messaging system is modified and enhanced to perform the processing of the message inoculator 131.

In an embodiment, the message inoculator 131 sends the new email to the principal associated with the recipient message inbox 111 within an embedded URL link in the body of the new email. The URL link when activated by the principal within the body of the new email from the recipient message inbox 111, redirects to a web page were each of the images associated with the original sent email can be viewed by the principal.

In an embodiment, the message inoculator 131 sends the new email with another URL link in the body of the new email that when activated by the principal instructs the message inoculator 131 to release the original email in its original format to the message inbox 111 of the principal. In an embodiment, a variety of different types of new email URL links can be provided for the principal to select, such as release the original email body with any embedded links deactivated, release the original email body with any attachments stripped, release the original email in its entirety with embedded links and attached attachments, etc.

In an embodiment, the message inoculator 131 sends an out-of-band message to the principal (for example an instant message when the original message sent from the sender to the recipient (principal) was an email message) having a link to a website for viewing the inoculated message. That is, the message inoculator 131 can provide a different channel/mode of notifying the principal as to how to obtain the inoculated message from that which was used by the original sender of the message. This may be through an SMS message as well or an automated voice call, as a few examples of foreseeable inter-channel/model or out-of-band communication mechanisms to the recipient (principal) for retrieval of the inoculated message.

It is now appreciated how email security can be achieved through integration with existing email systems as an enhancement that improves email security and provides timely review of all emails to an intended recipient without relying on malicious pattern detection and updating and without relying a time-consuming and out-of-date digital certificate and digital signature validation processing.

These embodiments and other embodiments are now discussed with reference to the FIGS. 2-4.

Figure 2:
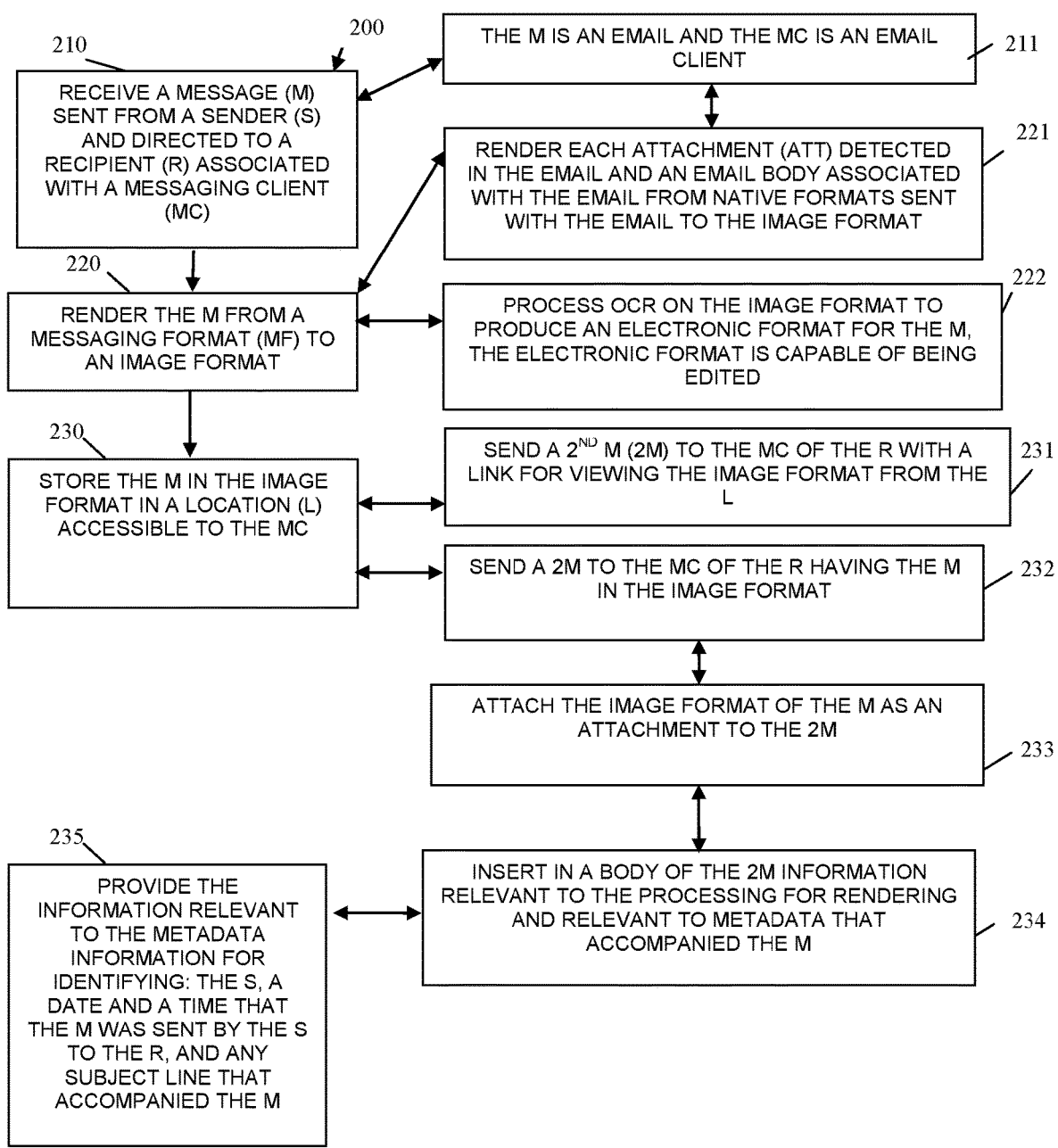
FIG. 2 is a diagram of a method for inoculating messaging communications, according to an example embodiment.

FIG. 2 is a diagram of a method 200 for inoculating messaging communications, according to an example embodiment. The method 200 is implemented as one or more software modules (herein after referred to as "message inoculator"). The message inoculator is represented as executable instructions that are implemented, programmed, and resides within memory and/or a non-transitory machine-readable storage media; the executable instructions execute on one or more hardware processors a device and has access to one or more network connections associated with one or more networks. The networks may be wired, wireless, or a combination of wired and wireless (as discussed above prior to the discussion of the FIG. 1).

In an embodiment, the message inoculator is the message inoculator 131.

In an embodiment, the message inoculator processes on the messaging gateway 130.

In an embodiment, the message inoculator processes as an enhancement on one or more devices of an existing messaging system.

In an embodiment, the message inoculator processes within or is a network device, such as a transparent proxy, a forward proxy, a reverse proxy, and/or router/hub/switch/firewall/bridge/switch.

At 210, the message inoculator receives a message sent from a sender and being directed from the sender over a network to a recipient associated with a messaging client and controlled or monitored by the messaging gateway or other device that executes the message inoculator.

The message is not delivered to the messaging client. The message inoculator obtains, intercepts (as defined above), and prevents the messaging client from handling or processing the message in its original sent format from the sender. This can be done in any of the manners and scenarios discussed above in the FIG. 1.

According to an embodiment, at 211, the message is an email, the device that executes the message inoculator is an email gateway, and the messaging client of the recipient of the email is an email client.

At 220, the message inoculator renders the message in an original sent messaging format from the sender to an image format (incapable of execution of by the messaging client) and only capable of being viewed or printed on the messaging client.

According to an embodiment of 211 and 220, at 221, the message inoculator renders each attachment detected in the email and an email body of the email from native formats associated with each attachment to the image format.

In an embodiment, at 222, the message inoculator processes Optical Character Recognition (OCR) on the image format for the message to produce an electronic format for the message. The electronic format is capable of being edited.

At 230, the message inoculator stores or retains the message in the image format in a location that is accessible to the messaging client or deliverable to the messaging client from the location.

In an embodiment, at 231, the message inoculator sends a new and second message to the messaging client of the recipient with a link for viewing the image format of the original message (sent from the sender) from the location.

In an embodiment, at 232, the message inoculator sends a new and second message to the messaging client of the recipient having the message in the image format. This differs from 231 in that at 232 the message in the image format is included within or as part of the second message sent from the message inoculator to the recipient through the recipient's messaging client whereas 231 provides a link for accessing the message in the image format within the second message.

In an embodiment of 232 and at 233, the message inoculator attaches the image format of the message as an attachment to the second message.

In an embodiment of 233 and at 234, the message inoculator inserts in a body of the second message information relevant to the render processing performed by the message inoculator and also relevant to metadata that accompanied the message in the original messaging format as sent from the sender. In an embodiment, the information relevant to the render processing performed by the message inoculator may also be included in the message header.

In an embodiment of 234 and at 235, the message inoculator provides information relevant to the metadata for, at least, identifying: the sender of the message, a data and a time that the message was sent by the sender to the recipient, and any subject line description that accompanied the message when originally sent from the sender to the recipient.

FIG. 3 is a diagram of another method 300 for inoculating messaging communications, according to an example embodiment. The method 300 is implemented as one or more software module(s) (herein after referred to as "email gateway") on one or more hardware devices. The email gateway is represented as executable instructions that are implemented, programmed, and resides within memory and/ or a non-transitory machine-readable storage medium; the executable instructions execute on one or more hardware processors of a hardware device and has access to one or more network connections associated with one or more networks. The networks may be wired, wireless, or a combination of wired and wireless.

In an embodiment, the email gateway represents another and in some cases an enhanced perspective of the message inoculator 131 discussed above with the FIG. 1.

In an embodiment, the email gateway is an enhanced version of the method 200.

In an embodiment, the email gateway is the message inoculator 131.

In an embodiment, the email gateway processes within the messaging gateway 130.

In an embodiment, the email gateway processes as an enhancement within one or more devices of an existing email system.

At 310, the email gateway intercepts an email being sent from a sender to a recipient. This can be done in any of the manners described above with the description of the FIG. 1. The recipient and the recipient's device cannot view or process the email in its original sent format from the sender.

At 320, the email gateway renders data content or data present in the email from a first format (the original sent format sent from the sender) to a second format that is incapable of execution by a processing device, such as a view only image format or a print only print format.

According to an embodiment, at 321, the email gateway identifies a portion of the data content or data as an attachment to the email. The attachment is in a third format (a format different from a body of the email as originally sent from the sender). The email gateway renders, translates, and/or converts the attachment in the third format to the second format (image or print data format).

In an embodiment, at 322, the email gateway identifies a portion of the data content or data as an embedded link, which the email gateway traverses or activates, and, then, renders, translates, and/or converts a web page (presented when the embedded link is traversed) from a web format to the second format (image or print data format).

In an embodiment of 322 and at 323, the email gateway provides the embedded link to an external environment (external to a processing environment of the email gateway) for that external environment to traverse the embedded link and render the resulting web page or web pages from the web format to the second format.

At 330, the email gateway provides a mechanism for the recipient to access the email (and any of its components) in the second format (image or print data format).

According to an embodiment, at 331, the email gateway provides the mechanism as a second, new, and different email (from the original sent email from the sender). The second email is sent from the email gateway to the recipient with the original email sent from the sender attached as an attachment to the second email in the second format (image or print data format).

In an embodiment, at 332, the email gateway provides the mechanism as a second, new, and different email (from the original sent email from the sender). The second email is sent from the email gateway to the recipient with metadata that accompanied the original email sent from the sender in the body of the second email and with a link for accessing the original sent email in the second format (image or print data format).

In an embodiment, at 333, the email gateway provides the mechanism as a separate website independent of an email client for the recipient that the recipient can log into and view and/or print the email in the second format (image or print data format).

Figure 4:
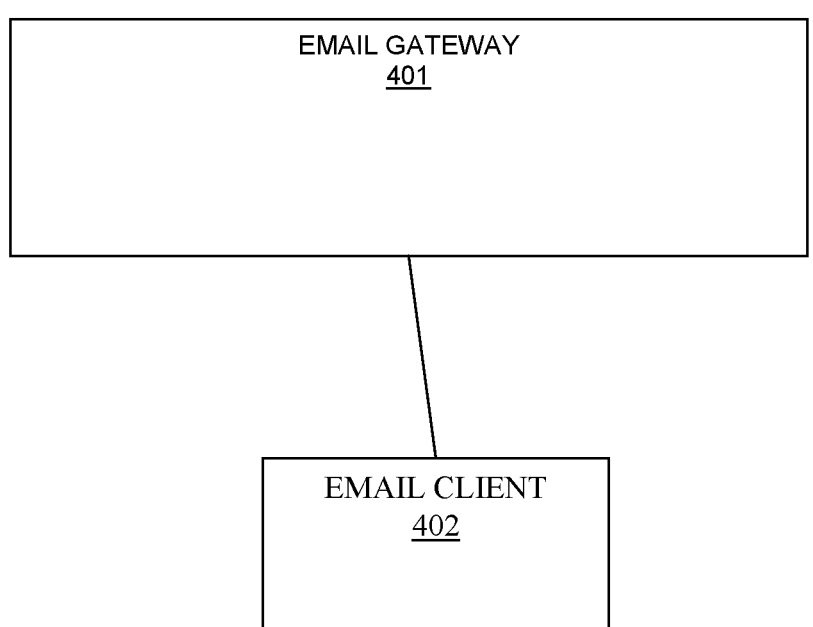
FIG. 4 is a diagram of a system for inoculating messaging communications, according to an embodiment.

FIG. 4 is a diagram of a system 400 for inoculating messaging communications, according to an embodiment. Various components of the system 400 are software module (s) represented as executable instructions, which are programed and/or reside within memory and/or non-transitory computer-readable storage media for execution by one or more hardware devices. The components and the hardware devices have access to one or more network connections over one or more networks, which are wired, wireless, or a combination of wired and wireless.

In an embodiment, the system 400 implements, inter alia, the processing depicted in the FIGS. 1-3. Accordingly, embodiments discussed above with respect to the FIGS. presented herein and above are incorporated by reference herein with the discussion of the system 400.

The system 400 includes an email gateway 401 and an email client 402.

The email gateway 401 is configured to: i) execute on one or more processor(s) of a device, ii) process emails being sent to the email client 402 before the email client 402 has access to the emails in their original sent formats by rendering/translating/converting data content or data present in the emails to a non-executable format, and iii) provide the email client 402 with access to the emails in the non-executable format.

In an embodiment, the email gateway 401 includes any, all, or some combination of: messaging gateway 130, message inoculator 131, the method 200, and the method 300.

In an embodiment, the email gateway 401 is further configured to render any attachments in any of the emails to the non-executable format.

In an embodiment, the email gateway 401 is further configured to send separate emails to the email client 402 with a mechanism for viewing the emails in the non-executable format.

In an embodiment, the email gateway 401 is further configured to acts as a proxy for a second email gateway to the email client 402. The second email gateway directly interacts with the email client 402 and the second email gateway is an existing email gateway for the email client 402 is unmodified.

In any of the previous embodiments, the processing described for the message inoculator 131, the method 200, the method 300, and the email gateway 401 can also image the original metadata that accompanies the original sent message from the sender and make that metadata accessible to the intended recipient in the image or print data format.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:

intercepting, at a gateway, a message directed to a message client;

transforming, by the gateway, the message into an image format by taking at least four images associated with at least four types of images of the message in a pixel format, wherein taking the at least four types of images further includes capturing a first image associated with a first image type for a body of the message, capturing a second image associated with a second image type for any attachments associated with the message wherein capturing the second image associated with the second image type for any attachments includes opening each attachment using an application that is known to display an attachment type for that attachment and imaging or printing each opened attachment to the image format, capturing a third image associated with a third image type for web pages associated with any embedded links within the message, and capturing a fourth image associated with a fourth image type for metadata of the message, wherein the metadata comprises a header field, other fields associated with the message, an email server identifier, a date and time the message was sent, a recipient identifier for a recipient of the message, and a sender identifier for a sender of the message;

notifying, by the gateway, the recipient of the message that the message was received;

providing, by the gateway, the at least four images associated with the message in the image format for viewing on the message client while preventing the message client from accessing the message in an original format associated with the message; and integrating the intercepting, the transforming, the notifying, and the providing within an existing email system as an enhancement to email security that provides review of all email messages directed to the message client without requiring updated virus and spyware pattern definitions and without relying on out-of-date digital certificate and digital signature validation processing for the email messages, wherein the integrating further includes processing the method as a milter process initiated on the gateway upon receipt of the message directed to the recipient;

wherein the message is incapable of being executed or processed by the message client or a device executing and accessing the message client.

2. The method of claim 1, wherein transforming further includes producing print data for printing the at least four images associated with the message wherein the print data is in the image format.

3. The method of claim 1, wherein transforming further includes capturing one or more screenshots of the message while displayed on the gateway to produce the at least four images in the image format.

4. The method of claim 1, wherein transforming further includes parsing the body of the message to identify the embedded links within the message.

5. The method of claim 4, wherein parsing further includes traversing each link and imaging a source web page associated with that link and adding an imaged version of the source web page as a particular attachment to the message in the image format for each of the at least one second images associated with the second image type.

6. The method of claim 1, wherein transforming further includes stripping the metadata associated with the message from the body of the message.

7. The method of claim 6, wherein stripping further includes converting text of the metadata into the pixel format of the fourth image and converting text of the body of the message into the pixel format of the fourth image.

8. The method of claim 1, wherein transforming further includes scanning the message for the attachments, opening each attachment, transforming each content of each attachment into the at least one second image of the second image type.

9. The method of claim 1, wherein notifying further includes constructing a second message and sending the second message to the recipient as a notification that the message in the image format is available for viewing.

10. The method of claim 1, wherein providing further includes making the metadata associated with the message, the body or payload associated with the message, and the attachments provided with the message available to the message client as images viewable from the message client via the first image, the at least one second image, and the fourth image.

11. A method, comprising:

preventing, by a proxy device, a message that is sent from a sender in an original format from being delivered to a recipient on a message client device;

converting, by the proxy device, the message from the original format into an image format by taking at least four images associated with at least four image types for the message in a pixel format, wherein taking the image further include capturing a first image type for a first image associated with a body of the message, taking a second image type for at least one second image associated with any attachments of the message wherein taking the second image type for at least one second image associated with any attachments includes opening each attachment using an application that is known to display an attachment type for that attachment and imaging or printing each opened attachment to the image format, taking a third image type for at least one third image associated with any embedded links of the message, and taking a fourth image type for a fourth image associated with metadata of the message, wherein the metadata comprises a header field, other fields associated with the message, an email server identifier, a date and time the message was sent, a recipient identifier for the recipient of the message, and a sender identifier for the sender of the message;

delivering, by the proxy device, the at least four images associated with the message in the image format to the message client device for access by the recipient; and integrating the preventing, the converting, and the delivering within an existing email system as an enhancement to email security that provides review of all email messages directed to the message client device without requiring updated virus and spyware pattern definitions and without relying on out-of-date digital certificate and digital signature validation processing for the email messages, wherein the integrating further includes acting as a forward proxy or a transparent proxy to a messaging server associated with the message client device;

wherein an original message, associated with the message sent from the sender, is completely rendered innocuous and the message is incapable of infecting, spying, or phishing the device or the message client device.

12. The method of claim 11, wherein preventing further includes integrating the method into a messaging server associated with the message client device.

13. The method of claim 11, wherein converting further includes converting the body or a payload of the message into the first image associated with the first image type and the metadata of the message into the fourth image associated with the fourth image type.

14. The method of claim 13, wherein converting further includes converting sites associated with the embedded links of the body or the payload into the third image associated with the third image type.

15. The method of claim 14, wherein converting further includes converting the attachments that were attached to the message into the second image associated with the second image type.

16. The method of claim 15, wherein delivering further includes attaching the first image, the at least one second image, the at least one third image, and the fourth image into a new message and sending the new message to the recipient at the message client device.

17. The method of claim 16, wherein attaching further includes providing second metadata for the new message that includes portions of the metadata associated with the message.

18. A system, comprising:

a proxy device; and a message gateway;

wherein the message gateway is configured to:

invoke the proxy device when a message is received from a sender and is directed to a recipient of a message client;

wherein the proxy device is configured to: convert the message from an original message format to an image format by taking at least four images of the message in a pixel format and provide the the at least four images in the image format back to the message gateway, wherein taking the image further includes capturing a first image type for a first image associated with a body of the message, capturing a second image type for at least one second image associated with any attachments of the message wherein capturing the second image type for at least one second image associated with any attachments includes opening each attachment using an application that is known to display an attachment type for that attachment and imaging or printing each opened attachment to the image format, capturing a third image type for at least one third image associated websites for any embedded links within the message, and capturing a fourth image type for a fourth image associated with metadata of the message, wherein the metadata comprises a header field, other fields associated with the message, an email server identifier, a date and time the message was sent, a recipient identifier for the recipient of the message, and a sender identifier for the sender of the message;

wherein the message gateway is further configured to: send the at least four images associated with the message in the image format to the recipient on the message client;

wherein message gateway and the proxy device are integrated within an existing email system as an enhancement to email security that provides review of all email messages directed to the message client device without requiring updated virus and spyware pattern definitions and without relying on out-of-date digital certificate and digital signature validation processing for the email messages, wherein the proxy device is further configured to: convert any of the attachments into the at least one second image of the second image type and convert any web pages referenced as any of the embedded links at the websites into the at least one third image of the third image type and provide the first image in a new message in the image format with attachment images to the message gateway, wherein the attachment images comprise the at least one second image and the at least one third image to the message gateway;

wherein the message is incapable of being executed or processed by the message client or a device executing and accessing the message client.

\* \* \* \* \*